INVENTOR.
R.C. SCOFIELD
BY Young & Quigg
ATTORNEYS

United States Patent Office 3,287,884
Patented Nov. 29, 1966

3,287,884
SEPARATION AND RECOVERY OF ACETYLENE FROM GASES CONTAINING THE SAME
Raymond C. Scofield, Bartlesville, Okla., assignor to Phillips Petroleum Company, a corporation of Delaware
Filed Dec. 9, 1963, Ser. No. 329,089
4 Claims. (Cl. 55—63)

This invention relates to a process and apparatus for separating and recovering acetylene from gases containing the same.

In recent years, increased demand for acetylene in commercial quantities, and the desirability of removing acetylene from certain process streams, has focused attention on the need for cheap and more efficient processes and means for separating acetylene from gases containing the same, and, where economical, for recovering the separated acetylene. Many processes are well known in the art for the production of acetylene from low molecular weight, normally gaseous hydrocarbons, such as methane, propane, and natural gas, by subjecting such hydrocarbons to thermal cracking or pyrolytic reactions. The gaseous product produced by such reactions usually contain, in addition to acetylene, other low molecular weight hydrocarbons, including paraffinic and ethylenically unsaturated hydrocarbons, as well as carbon monoxide, carbon dioxide, hydrogen, and nitrogen. Olefins normally produced in refining and other operations usually contain acetylene as an impurity which has a poisoning effect on many olefin reaction catalysts. The separation of acetylene from gases, whether it be considered as a desirable or undesirable component therein, is usually effected by absorption processes, which require compression, a large volume of liquid absorbent, and considerable refrigeration capacity, and by selective hydrogenation processes, which require the use of catalysts that are often poisoned by components such as carbon monoxide which are often present in the gaseous stream being hydrogenated. Many of the absortpion processes do not produce a highly concentrated acetylene product stream, and the hydrogenation processes result in the conversion (and thus the loss) of the acetylene to ethylene.

Accordingly, an object of this invention is to provide an improved process for separating acetylene from gases containing the same. Another object is to provide an improved process for separating and recovering acetylene from gases containing the same, such as the gaseous effluent stream produced by methane pyrolysis in a plasma jet or that produced by thermal cracking of hydrocarbon, or olefinic streams containing acetylene as an impurity, which separation and recovery process does not have the disadvantages of the prior art absorption and hydrogenation processes described above. Further objects and advantages of this invention will become apparent to those skilled in the art from the following description, appended claims, and the accompanying drawing in which:

Figure 1:
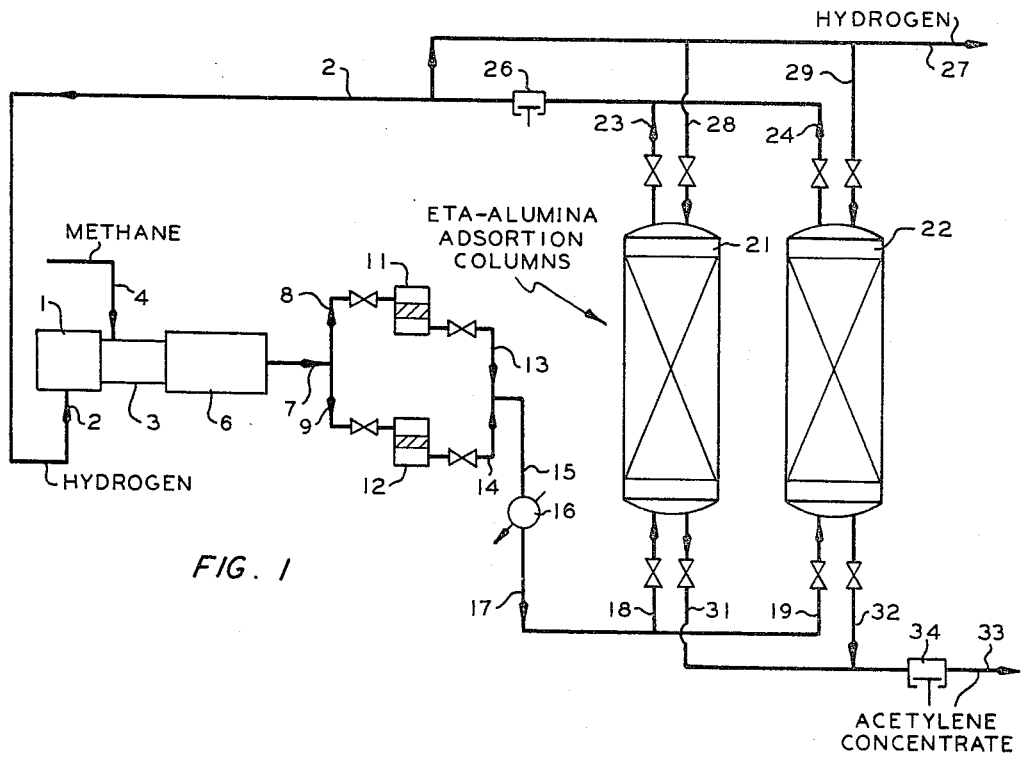
FIGURE 1 is a schematic flow sheet of a plasma jet device and a plurality of adsorbers used in the practice of this invention to separate and recover acetylene and hydrogen from the gaseous effluent produced by methane pyrolysis in the plasma jet device.

Briefly stated, I have discovered that acetylene can be separated from a gaseous stream containing the same in admixture with other gases by passing such stream through a fluid-permeable bed comprising eta-alumina. The adsorbed acetylene can thereafter be removed or desorbed from the bed, for example by displacement with another gas such as hydrogen or heptane, to recover the separated acetylene, the bed being cooled and regenerated for further adsorption service. The adsorption step is carried out at low temperatures and elevated pressures and the desorption and regeneration steps are carried out at elevated temperatures and low pressures. The eta-alumina is highly selective toward acetylene and tightly holds the acetylene, and this affinity of the adsorbent for the acetylene can be overcome by displacing the adsorbed acetylene with said displacing gas. The displacement of the adsorbed acetylene results in the production of a highly concentrated acetylene product stream in good yield.

Eta-alumina is a species of anhydrous crystalline alumina, but it has a cubic, spinel-type of crystal structure which distinguishes it from other anhydrous aluminas, such as beta-alumina. Eta-alumina can be formed by the thermal decomposition (in dry air or steam) of beta-alumina trihydrate, which can be prepared by rapid precipitation from sodium aluminate solution. For example, particulate beta-alumina trihydrate larger than 8 mesh can be heated leisurely to a temperature of 932° F. and and calcinated at this temperature for 2 hours to convert it to eta-alumina. The eta-alumina so prepared, will have, for example, an average pore diameter of 40 to 80 Angstroms, a surface area of 100 to 190 square meters per gram, a xylol density of 3.40 to 3.52, and a bulk density of 34.3 pounds per cubic foot.

Referring now to the drawing, and initially to FIGURE 1, a plasma jet device or generator 1 described below, is fed with hydrogen supplied via line 2 to provide a plasma jet stream which passes into a reactor 3 to which methane is supplied via line 4. The reactor effluent is quenched or cooled by means of cooler 6 and the quench effluent 7 can be alternately passed via lines 8 and 9 through carbon filter beds 11 and 12. The filtered effluent in lines 13 and 14 can be passed via line 15 to a cooler 16 for reduction of the temperature to near atmospheric temperature. The resulting cooled effluent 17 is then passed alternately via lines 18 and 19 to adsorber columns 21 and 22, each of which contains a fluid permeable, granular, fixed bed comprising eta-alumina. Columns 21 and 22 can be operated cyclically, i.e., while one column is on adsorption service, the other column is on desorption-regeneration service. The effluent passes through the eta-alumina beds in the columns and in so doing the acetylene is adsorbed. Off-gas comprising hydrogen is removed from columns 21 and 22 via lines 23 and 24, respectively, and this off-gas can be compressed by means of compressor 26. A portion of the compressed gas is recycled via line 2 to the plasma jet generator 1 and another portion passed via product line 27. Columns 21 and 22 are alternately desorbed and regenerated, using off-gas supplied via lines 28 and 29, respectively, for the purpose of stripping the adsorbed acetylene from the eta-alumina beds and thereafter for cooling and regenerating the same. For example, when column 21 is on adsorption service, the hydrogen-acetylene gas is passed thereto via line 18 and off-gas is withdrawn via line 23 while a portion of the hydrogen stream 27 is passed as stripping gas via line 29 to column 22 and desorbed acetylene concentrate is removed via line 32. The acetylene concentrate or product can be passed via line 33 after it is compressed by means 34.

It should be understood that the source of the acetylene-containing gas which is separated by means of the eta-alumina bed is not limited to that obtained by the pyrolysis of methane in a plasma generator, such as shown in FIGURE 1. Rather, this is only a presently preferred source of the acetylene-containing gas which is separated according to this invention.

Figure 2:
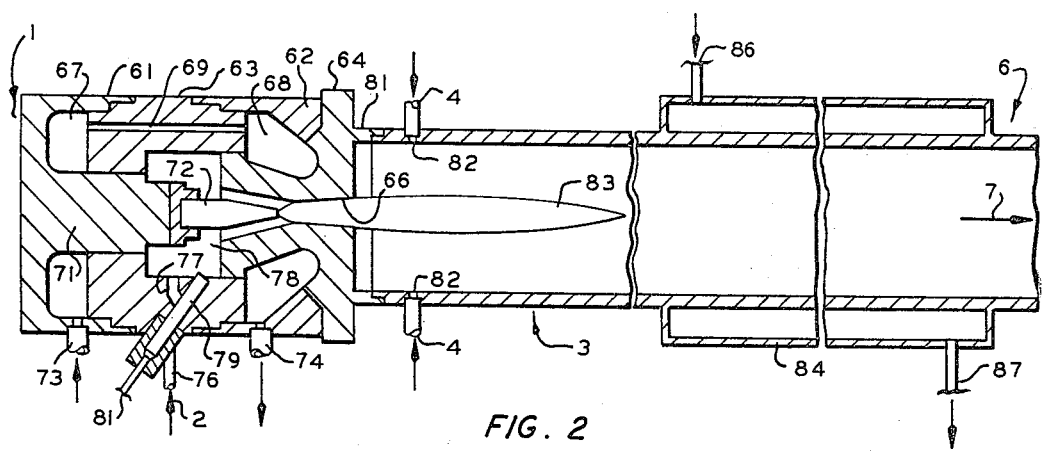
FIGURE 2 is a diagrammatic illustration, partly in cross-section, of one type of a plasma jet device which can be used for methane pyrolysis.

Plasma generators are well known in the art, and FIGURE 2 illustrates one type thereof which can be used in this invention. Looking now at that figure, plasma jet generator 1 comprises an annular rear housing 61 and an annular front housing 62 separated by an annular insulator member 63, all connected together by suitable connecting means not shown. Front electrode 64 is mounted on said front housing 62 and is provided with an orifice or nozzle passage 66 in the front side thereof. Said orifice 66 extends inwardly from the outward side of and through said electrode 64 and flares outwardly with the wall thereof forming a passage (generally V-shaped in cross section) at the rear end of orifice 66. Annular front housing space 68 is formed between said front electrode 64 and said insulator member 63, said front housing member 62 and said front electrode 64 including the outer wall of said V-shaped passage. A water cooling passageway 69 connects said cooling water space 67 and said space 68. Electrode holder 71 extends forwardly from the outer rear wall of rear housing 61 and has mounted in the forward end thereof a rear electrode 72 which is tapered as shown and extends into said V-shaped nozzle passage 66 formed in said front electrode 64. The latter is conveniently made of copper and said rear electrode 72 is conveniently made of thoriated tungsten. However, any other suitable materials can be used to fabricate said electrodes. A water-cooled electrical cable 73 is connected to said rear housing 61. Said cable 73 is of conventional construction and consists of a metal electrical conductor surrounded by an insulation cover material provided with cooling water passages through which cooling water flows into the cooling water space 67. When said cable 73 is connected to a source of current, the current flows through said rear housing 61, electrode holder 71 and into rear electrode 72. Cooling water flows from said cable 73 into said cooling water space 67. Another water-cooled electrical cable 74, like said cable 73, is connected to said front housing 62 and provides a discharge connection for cooling water space 67 through passageway 69 and into cooling water space 68. An inlet conduit 76 for an arc or plasma forming gas, such as hydrogen, from line 2 extends through said insulation member 63 via conduit 77 and communicates with space 78 formed between said insulation member 63 and said front electrode 64 and surrounding said rear electrode 72. A capacitance starting device 79 or the like powered by line 81 can be used to provide a high frequency source of alternating current to provide an arc for start-up of the generator.

The operation of said plasma jet generator 1 is well known and it will not be described herein the interest of brevity. Examples of other plasma jet generators that can be employed are those disclosed in U.S. Patent Nos. 2,922,869 and 2,960,594.

Located downstream of generator 1 is a reactor 3 which can be connected thereto, but is separated therefrom by insulator ring 81. Reactor 2 is provided with a plurality of circumferentially spaced openings 82, to which methane is supplied via lines 4. In reactor 3, the plasma jet or torch 83 produced by generator 1 is contacted with the methane with a consequent pyrolysis thereof to produce stream 7 comprising acetylene and hydrogen. The resulting reaction effluent 7 passes into cooling means 6, which can be a pipe surrounded by water jacket 84 to which cold water is supplied via line 86 and withdrawn via line 87.

Figure 3:
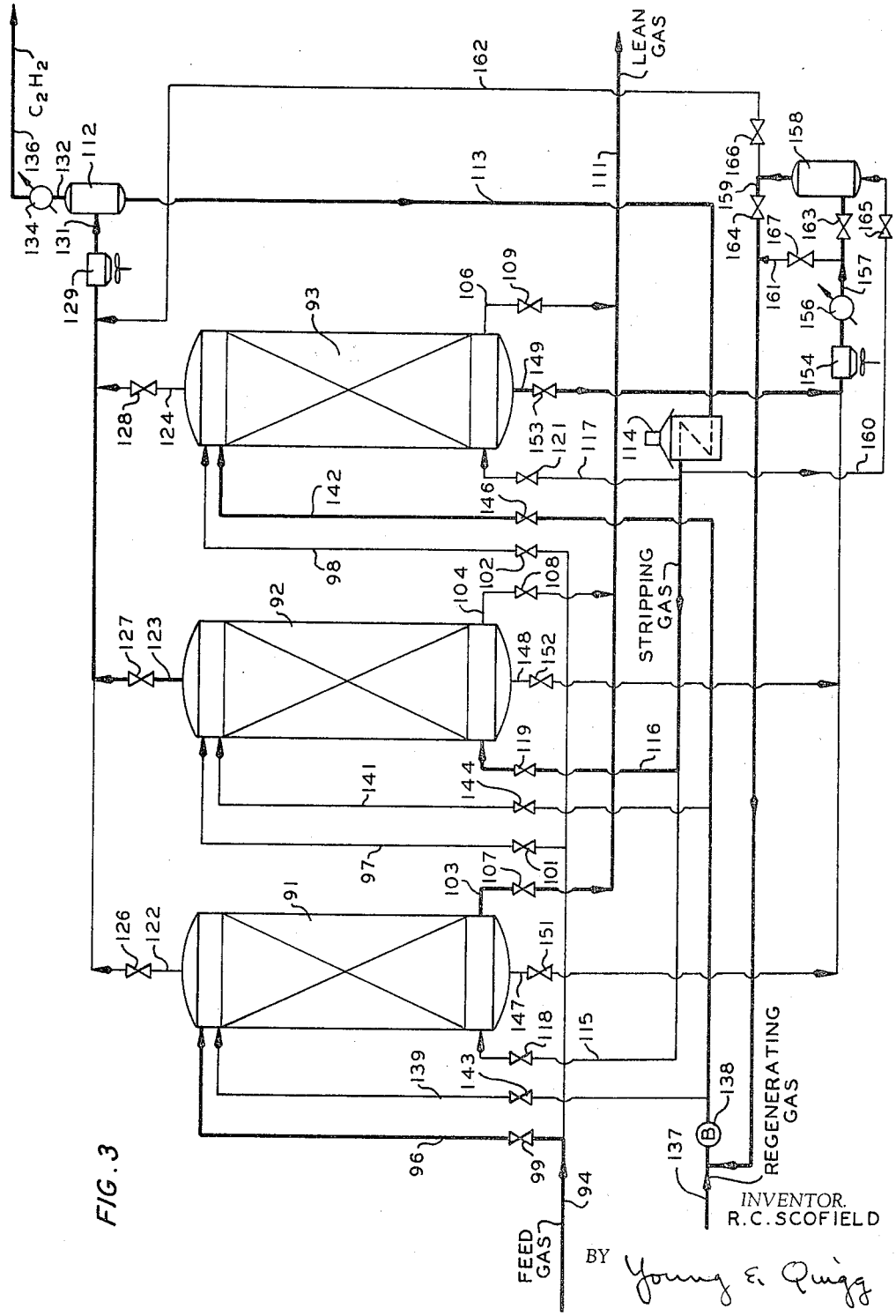
FIGURE 3 is a schematic flowsheet of a plurality of adsorbers which can be operated according to another embodiment of this invention to separate and recover acetylene.

In FIGURE 3, I have illustrated another embodiment of this invention wherein three parallel absorber columns 91, 92 and 93, each containing a fixed bed comprising eta-alumina, are used in a cyclic operation for the adsorption of acetylene from feed gas 94 containing the same, such as the gas produced by the plasma jet equipment of FIGURE 2. Said feed gas 94 is cyclically introduced into the top of each of the columns 91, 92 and 93 by means of inlet lines 96, 97 and 98, respectively, the flow rates in these inlet lines being controlled by flow control valves 99, 101 and 102, respectively. Lean gas (for example, hydrogen, where the feed gas is obtained from a plasma jet) is cyclically removed from the bottom of adsorber columns 91, 92 and 93 via outlet lines 103, 104 and 106, each of which is provided with flow control valves 107, 108 and 109, respectively, to produce a lean gas product stream 111. Following adsorption service, each of the columns is desorbed with a stripping gas, for example n-heptane, supplied from surge tank 112. The heptane can be withdrawn from the latter tank via line 113 and vaporized in a tube furnace 114 or the like and supplied via lines 115, 116 and 117 to the bottom of columns 91, 92 and 93, respectively, the flow rates of stripping gas in said feed lines being controlled by means of control valves 118, 119 and 121, respectively. Desorbed acetylene and used stripping gas is removed from the tops of columns 91, 92 and 93 via outlet lines 122, 123 and 124, respectively, the flow rates thereof being controlled by means of flow control valves 126, 127 and 128, respectively. The mixture of heptane and acetylene can be cooled, for example, by means of an air fan cooler 129, to condense the heptane. The cooled mixture is then passed via line 131 to surge tank 112. Uncondensed vapors rising from the top of tank 112 via line 132 are cooled by means of a condenser 134 or the like; the resulting condensed heptane falls back into tank 112 and the uncondensed gas comprising acetylene is recovered via line 136 as product. The desorbed eta-alumina beds in the columns can then be cooled and regenerated with a regenerating gas, such as hydrogen (or lean gas 111), supplied via line 137. The latter can be provided with a blower 138 to transport regenerating gas via lines 139, 141 and 142, having flow control valves 143, 144 and 146 therein, respectively, to columns 91, 92 and 93. The used regenerating gas is then withdrawn from the bottom of columns 91, 92 and 93 by means of lines 147, 148 and 149, having flow control valves 151, 152 and 153 therein, respectively. The used regenerating gas, which will contain some heptane, can be cooled, for example by means of an air fan cooler 154 and a condenser 156 and passed via line 157 to a small adsorber 158 containing carbon or the like for removal of the residual heptane. The off-gas from adsorber 158 can then be recycled via line 159 to blower 138. Adsorber 158 can be periodically regenerated with the same stripping gas used in stripping columns 91, 92 and 93. For example, the used regenerating gas can bypass adsorber 158 via line 161 and a small stream 160 of the stripping gas can be passed to adsorber 158, with the off-gas thereof, containing desorbed heptane, being recycled via line 162 through cooler 129 and line 131 to tank 112. In regenerating adsorber 158, valves 163 and 164 are closed and valves 165, 166 and 167 are opened; after such desorption, the positions of these valves can be reversed.

The operation of the adsorber columns in FIGURE 3 is illustrated by the heavily-inked flow lines. As shown, adsorber 91 performs the adsorption stage of the cycle while adsorber 92 performs the desorption stage and adsorber 93 performs the cooling and regenerating stage. The positions of the various flow control valves of FIGURE 3 during the operation of each adsorber should be readily apparent. When adsorber 91 is performing the adsorption stage of the cycle, valves 99 and 107 are open and valves 118, 126, 143 and 151 are closed. When adsorber 91 is performing the desorption stage of the cycle valves 118 and 126 are open and valves 99, 107, 143 and 151 are closed. When adsorber 91 is performing the cooling-regeneration stage of the cycle, valves 143 and 151 are open and valves 99, 107, 118 and 126 are closed. Each of the other adsorbers operates in a similar fashion and the positions of the valves associated with each adsorber during the various stages thereof should be obvious.

As an example, referring now to FIGURE 1, hydrogen is fed to the plasma generator 1 to provide a plasma jet or torch 83 (shown in FIGURE 2) having a temperature of 9000° F. with an enthalpy of 130,000 B.t.u. per pound of hydrogen, which represents an electrical power to gas heating efficiency of 80%. The plasma torch produces a gas of 9% acetylene. Methane feed, preheated to 1100° F., is introduced via line 4 into reactor 6, and the methane is cracked to 96% conversion. The electrical energy requirement for this level of conversion is 4.68 kwh. per pound of acetylene. The reactant effluent is cooled and supplied at 12 p.s.i.g. and 85° F. to adsorbers 21 and 22 alternately.

Table I provides a material balance for the above-described example, with the stream components given in mols per 100 pounds of methane feed.

TABLE I

|  | Adsorber feed, 17 | Acetylene product, 33 | Recycle hydrogen, 2 | Off-gas product, 27 |
|---|---|---|---|---|
| Hydrogen | 22.90 | 0.59 | 13.15 | 9.16 |
| Methane | 0.22 | 0.01 | 0.12 | 0.09 |
| Acetylene | 2.30 | 2.24 | 0.04 | 0.02 |
| Ethylene | 0.08 | 0.01 | 0.04 | 0.03 |
| Propane | 0.10 | 0.10 | | |

Various modifications and alterations of this invention will become apparent to those skilled in the art without departing from the scope and spirit of this invention, and it should be understood that this invention is not to be limited unduly to that set forth herein for illustrative purposes.

I claim:

1. A process for separating acetylene from a gas containing the same by adsorption, which comprises passing said gas through a fluid permeable bed comprising eta-alumina, withdrawing lean unadsorbed gas from said bed, passing a stripping gas through said bed, withdrawing stripping gas enriched with desorbed acetylene from said bed, cooling the stripping gas and acetylene, separating the stripping gas and acetylene to produce a highly concentrated acetylene product stream, and passing a regenerating gas through said bed to cool and regenerate the same.

2. A process for separating acetylene from a feed gas containing the same by adsorption, which comprises cyclically passing said gas through a plurality of fluid permeable, fixed beds comprising eta-alumina, withdrawing lean unadsorbed gas from one of said beds, passing a stripping gas through said rich bed, withdrawing stripping gas and acetylene to produce a highly concentrated acting the stripping gas and acetylene, separating the stripping gas and acetylene to produce a highly concentrated acetylene product stream, and passing a regenerating gas 3,105,858  10/163  Kresge et al.

3. The process of claim 2, where said feed gas is that obtained by pyrolysis of methane in a plasma jet generator, and said lean, stripping and regenerating gases are hydrogen.

4. The process according to claim 2, wherein said feed gas is that obtained by pyrolysis of methane in a plasma jet generator, said lean and regenerating gases are hydrogen, and said stripping gas is n-heptane.

References Cited by the Examiner

UNITED STATES PATENTS

| 2,900,430 | 8/1959 | Henke et al. | 55—63 |
| 2,960,594 | 11/1960 | Thorpe | 219—75 |
| 3,105,858 | 10/1963 | Kresge et al. | |
| 3,130,021 | 4/1964 | Milton | 55—75 |
| 3,176,445 | 4/1965 | Collins et al. | 55—75 |

OTHER REFERENCES

Newsome et al.: Alumina Properties, Aluminum Company of America, Pennsylvania 1960, TA480A6A52 No. 10, pp. 45–48.

REUBEN FRIEDMAN, *Primary Examiner.*

C. N. HART, *Examiner.*